United States Patent [19]

Smith

[11] 4,127,467
[45] Nov. 28, 1978

[54] IONIZATION CHAMBER FOR WATER TREATMENT SYSTEM

[75] Inventor: Charles N. Smith, Charlotte, N.C.

[73] Assignee: Water-Tronics, Inc., Charlotte, N.C.

[21] Appl. No.: 855,241

[22] Filed: Nov. 28, 1977

[51] Int. Cl.² .................... C25B 9/00; C25B 15/08; C02B 1/82
[52] U.S. Cl. ................................... 204/275; 204/149; 204/272
[58] Field of Search ................. 204/275, 149, 272

[56] References Cited

U.S. PATENT DOCUMENTS

| | | | |
|---|---|---|---|
| 3,528,905 | 9/1970 | Miller | 204/275 X |
| 3,758,399 | 9/1973 | Pendergrass | 204/275 X |
| 3,871,989 | 3/1975 | King | 204/275 X |
| 3,964,991 | 6/1976 | Sullins | 204/275 |

Primary Examiner—John H. Mack
Assistant Examiner—D. R. Valentine
Attorney, Agent, or Firm—Richards, Shefte & Pinckney

[57] ABSTRACT

An ionization chamber for use in eliminating or controlling scale in water systems, such ionization chamber including a generally cylindrical housing having a side wall and ends, and an electrode, extending within the housing along the longitudinal axis thereof, the electrode and the housing being connected to the opposite poles of a source of direct current. The electrode projects into the housing through one end wall thereof, and the extending end of the electrode is spaced from the opposite end wall of the housing by a dimension substantially equal to the radial spacing between the electrode and the side wall of the housing. A dielectric sleeve is arranged about the electrode, and extends along the electrode from the aforesaid one end wall for a length corresponding to the spacing between the end of the electrode and the opposite end wall of the housing. As a result, the exposed electrically conductive portion of the electrode is substantially equally spaced at all points therealong from the surrounding housing, whereby the electrical energy generated between the housing and the electrode is substantially evenly distributed throughout the ionization chamber.

8 Claims, 4 Drawing Figures

IONIZATION CHAMBER FOR WATER TREATMENT SYSTEM

BACKGROUND OF THE INVENTION

In fluid systems which carry water, such as boiler systems, air conditioning systems, water towers and the like, a persistent problem which must be dealt with is the accumulation and depositing of scale on the interior surfaces of the system components which reduce significantly the efficiency of the system. For example, the accumulation of scale at the interior surfaces of a boiler adversely affect the thermal efficiency thereof, and the accumulation of scale at the interior surfaces of pipes and conduits will tend to choke the free flow of water therethrough and thereby reduce the overall efficiency of the entire system in which such pipes are disposed.

There are several known methods of controlling the formation of scale, including the use of ultrasonic vibrators to physically remove scale which has already formed in the system, the use of chemical additives which help to prevent scale deposits, and the use of positive and negative electrodes which are dispersed in the water to act as a galvanic couple which reduces the formation of scale by the salts which are contained in the water.

The ultrasonic vibration method of reducing scale is relatively expensive, and, additionally, particles of scale are simply loosened from a surface so that they generally remain as suspended particles which can clog other equipment in the system.

Chemical additives, while being effective in reducing scale, have the disadvantages of being relatively expensive to use while also adulterating the water to which the chemicals have been added.

The use of electrodes to reduce or eliminate scale has also proved generally effective, but known electrode systems also have encountered certain drawbacks. In such known systems, the proximity of an electrode to the metallic or electrically charged components has been uneven so that the electrical energy generated between such electrode and the other components is undesirably concentrated so as to cause localized deterioration of the electrode and the other components, and to cause an uneven distribution of the ionization of the water flowing past the electrode and other components.

The present invention provides an improved ionization chamber in which an electrode is particularly arranged to provide an even distribution of electrical energy throughout the ionization chamber to thereby eliminate the aforesaid drawbacks normally associated with electrode ionization systems.

SUMMARY OF THE INVENTION

In accordance with the present invention, an ionization chamber is provided which includes a generally tubular housing formed of an electrically conductive material and having a side wall and opposite end walls, and an electrode is mounted in such housing to extend therewithin. The electrode has a portion thereof which is electrically conductive, and this portion is substantially equally spaced from the side wall and the end walls of the housing so that when the opposite poles of an electrical source are connected, respectively, to the housing and to the electrode, the electrical potential between the housing and the electrode will be substantially evenly distributed.

In the preferred embodiment of the present invention, the side wall of the housing is cylindrical, and the end walls of the housing have facing semi-spherical shapes, with the radius of the cylindrical side wall being substantially equal to the radius of the semi-spherical side walls. However, the end walls of the housing may also be flat.

Also, in the preferred embodiment of the present invention, the aforesaid even distribution of electrical potential is obtained by having the electrode extend from one end wall of the housing along the longitudinal axis of the housing, with the extending end of the electrode having a spacing from the opposite housing end wall substantially equal to the radius of the housing side wall, and with an insulating or dielectric covering disposed about the electrode and extending from the aforesaid one end wall for a length substantially corresponding to the aforesaid spacing between the extending end of the electrode and the opposite housing end wall.

The housing also includes an inlet conduit and an outlet conduit, both of which have flow axes lying at a small acute angle with respect to the longitudinal axes of the housing so that the water flowing through the ionization chamber will be substantially parallel to the longitudinal extent of the electrode.

DESCRIPTION OF THE PREFERRED EMBODIMENTS

Figure 1:
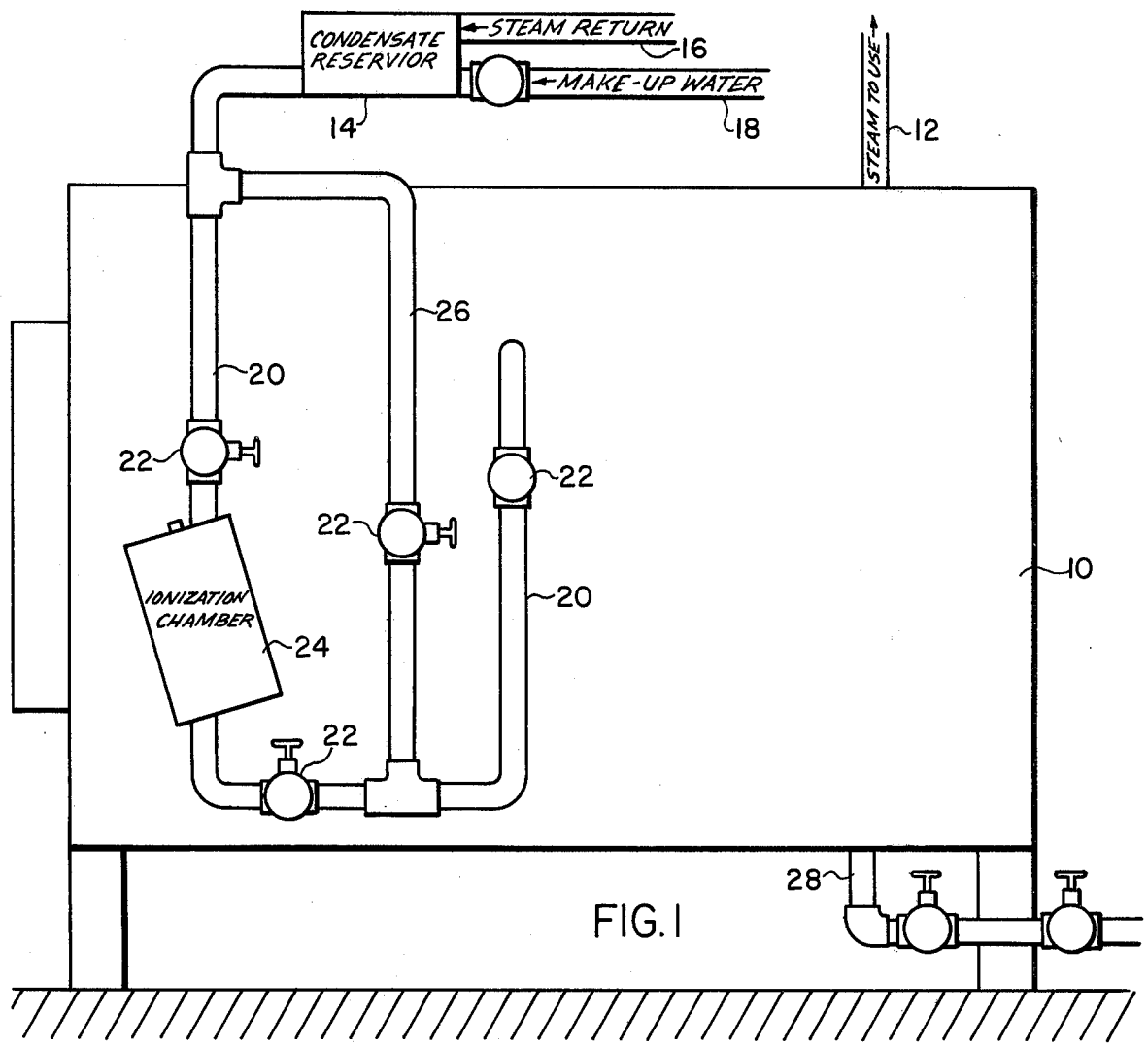
FIG. 1 is a diagrammatic illustration of a typical boiler system including an ionization chamber according to the present invention.

Looking now in greater detail at the accompanying drawings, FIG. 1 illustrates a boiler system representing a typical application of the ionization chamber of the present invention, but it is to be expressly understood that the ionization chamber of the present invention could be utilized in a variety of other systems, such as industrial or commercial air conditioning systems, in which water flows in a generally closed circuit.

The boiler system in FIG. 1 includes a conventional boiler 10 having an outlet line 12 through which steam generated in the boiler is conveyed to any desired point of use. After use, steam is returned to a condensate reservoir 14 through a steam return line 16, and a water line 18 is provided to add make-up water to the boiler system, as needed. Condensate from the reservoir 14 flows through an inlet line 20 to the boiler 10, the inlet line 20 having a plurality of valves 22 therein and having an ionization chamber 24 disposed therein, as will be described in greater detail below. A by-pass line 26 is provided around the ionization chamber 24 to permit normal operation of the boiler system when the ionization chamber 24 is taken off-line for repairs and the like. Finally, the boiler 10 is provided with a conventional blow-down line 28 extending to the bottom thereof.

Thus, the boiler system illustrated in FIG. 1 is a typical system in which water and steam flow in a closed circuit, and the ionization chamber 24 is located in such system so that all of the water flowing in the system passes through the ionization chamber 24.

Figure 2:
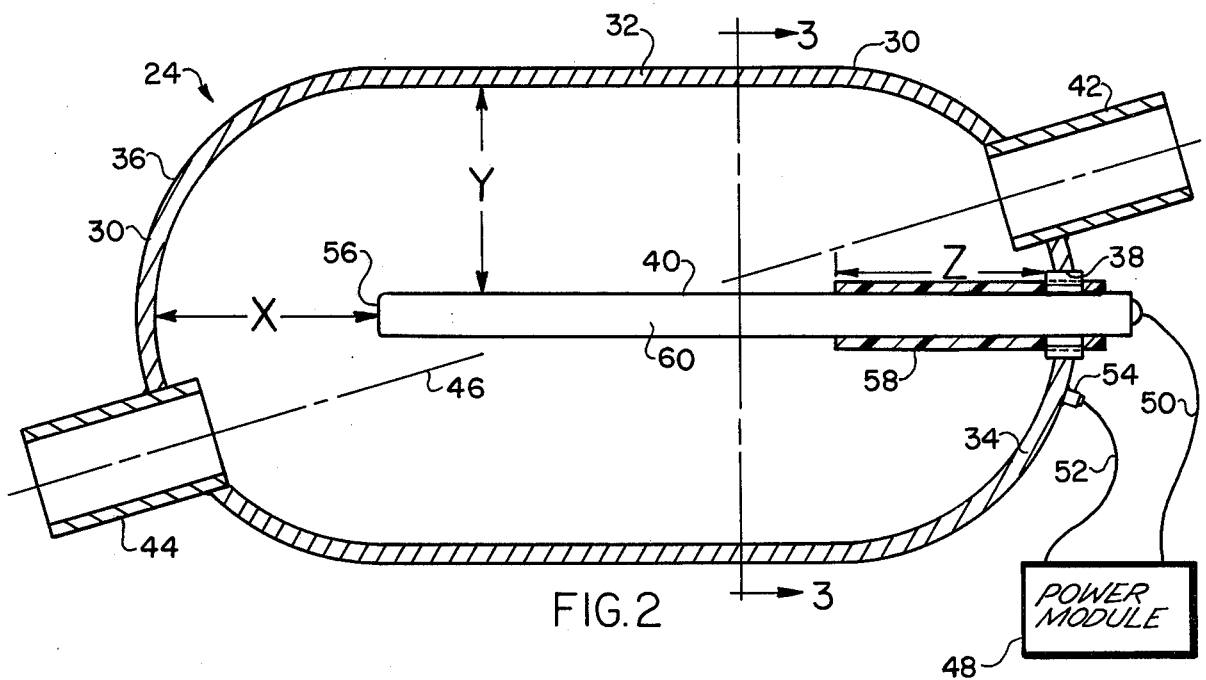
FIG. 2 is a sectional view of an ionization chamber according to the preferred embodiment of the present invention, taken through the longitudinal center line thereof.
Figure 3:
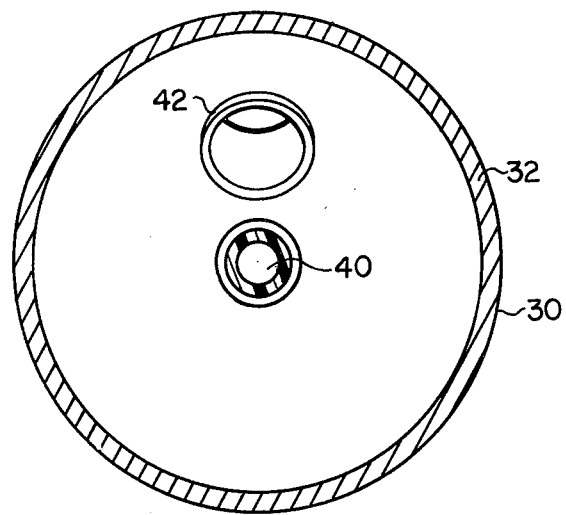
FIG. 3 is a sectional view of the ionization chamber illustrated in FIG. 2, taken along line 3—3 in FIG. 2.

FIGS. 2 and 3 illustrate the preferred embodiment of the ionization chamber 24 of the present invention, such ionization chamber including a generally tubular housing 30 formed of an electrically conductive metal. The housing 30 is formed by a cylindrical intermediate portion providing a longitudinally extending interior side wall 32, and two end portions are formed interiorly with facing semi-spherical end walls 34, 36 that they intersect tangentially with the cylindrical side wall 32. The right end wall 34 is formed with an opening 38 to receive a stainless steel electrode 40 which extends through the end wall 34 and along the longitudinal axis of the housing 30, such electrode 40 being removable from the opening 38 to permit repairs or replacement of the electrode 40.

The housing is also provided with a water inlet conduit 42 and a water outlet conduit 44 located in the end walls 34, 36, respectively, whereby water flows through the ionization chamber 24 from the inlet 42 to the outlet 44 in a direction generally parallel to the longitudinal extent of the electrode 40 whereby the water has a maximum exposure to the electrical potential generated between the electrode 40 and the housing 30 as will be explained below. While it may be generally preferable in this regard to have the inlet 42 and the outlet located directly on the longitudinal center line of the housing 30, such a location would interfere with the ability to remove the electrode 40 for replacement or repair as set forth above, and it has therefore been found that satisfactory results are obtained in both these respects by locating the inlet 42 and outlet 44 on a common flow axis represented by line 46 in FIG. 2, such flow axis 46 lying at a small acute angle (e.g. 16°) with respect to the longitudinal axis of the housing 30.

As illustrated in FIG. 2, a conventional power module 48 is represented in diagrammatic form, such power module 48 including a direct current electrical power source, a voltage regulator and a voltage switching unit for periodically changing the polarity of the electrical lead lines 50, 52 extending from the opposite poles of the aforesaid source of direct current, all in conventional manner well-known in the ionization chamber art. One lead line 50 is connected to the exterior end of the electrode 40, and the other lead line 52 is connected to an appropriate connector 54 formed as part of the housing 30 whereby, when the power module 48 is energized, opposite electrical potential will be imposed on the housing 30 and the electrode 40 to form a galvanic couple.

In accordance with a feature of the present invention, the electrode 40 is arranged in the housing 30 so that the electrically conductive portion of the electrode 40 is substantially equally spaced from the side wall 32 and the end walls 34, 36 of the housing 30 along the extent of such electrically conductive electrode portion whereby the electrical potential between the electrode 40 and the housing 30 will be distributed substantially uniformly throughout the ionization chamber 24. In this regard, the semi-spherical end walls 34, 36 of the housing 30 are formed by radii which corresponds to the radius of the cylindrical side wall 32 so that they intersect tangentially, and the electrode 40 extends along the longitudinal axis of the housing 30 with the extending end 56 of the electrode 40 being spaced from the end wall 36 by a dimension indicated by reference line X in FIG. 2, this dimension X being substantially equal to the dimension Y shown in FIG. 2 between the electrode 40 and the side wall 32. In a practical construction of the housing 30, it is generally preferable to form the side wall 32 and end walls 34, 36 with equal radii as set forth above, whereby the dimension Y would be slightly less than the dimension X because of the diameter of the electrode 40. However, the small variation is insignificant in terms of providing an even distribution of the electrical potential between the housing 30 and the electrode 40 so that for all practical purposes the dimensions X and Y are equal. Additionally, the end portion of the electrode 40 adjacent the end wall 34 is covered with an insulating or dielectric sleeve member 58, preferably formed of a Teflon plastic material, that extends therealong from the end wall 34 for a length, indicated by reference line Z, that corresponds substantially to the spacing X between the electrode end 56 and the end wall 36, whereby the dimensions X, Y and Z are all substantially equal. As a result, it will be apparent that the exposed or electrically conductive portion 60 of the electrode 40 is equally spaced from the side wall 32 and the end walls 34, 36 of the housing 30 along the entire extending length of the conducting portion 60 of the electrode 40. It will therefore be appreciated that when the electrode 40 and the housing 30 are connected, respectively, to the opposite poles of the source of direct current in the power module 48, the electrical potential between the housing 30 and the electrode 40 will be substantially equally distributed throughout the interior of the ionization chamber 24.

By virtue of this even distribution of electrical potential, there will be no localized concentration of electrical energy at small areas within the ionization chamber, which provides several advantages over prior art ionization chambers. First, such localized concentration of electrical energy usually results in a more rapid deterioration of the electrode 40 and the housing 30 at the points where such concentration exists. For example, if the insulating sleeve member 58 were not disposed about the end of the electrode 40 adjacent housing end wall 34, the proximity of the electrode 40 and the end wall 34 would result in a greater concentration of electrical energy therebetween as compared with the concentration between the remainder of the electrode 40 and the housing side wall 32 because of the greater spacing therebetween. As a result, "hot spots" would be present at the proximate portions of the electrode 40 and housing end wall 34, and would cause a more rapid deterioration of the material at these "hot spots." Such deterioration is a particular disadvantage with respect to the electrode 40 because it could result ultimately in a premature breaking of the electrode at the point of deterioration. Additionally, the even distribution of electrical energy provided by the ionization chamber of the present invention results in a more effective ionization of the water passing therethrough, and a more economical utilization of available electrical energy, because all of such water is exposed to substantially equal ionizing potential.

In a typical ionization chamber 24 constructed in accordance with the present invention, the housing 30 has the side wall 32 and the end walls 34, 36 formed with radii of 5 inches, and the water to be processed flows through the ionization chamber at approximately 6 feet-per-second. If this water is adulterated with approximately 100–600 parts of total dissolved solids or salts per million parts of water, a voltage within the range of seven to ten volts will normally prevent the accumulation of scale in the system. Preferably, the power module 48 causes a switching or alternation of the voltage polarity at the electrode 40 and the housing 30 approximately once every hour to prevent build-up of iron oxide particles on either of these elements. It is to be expressly understood, however, that the foregoing specifics are merely exemplary, and that the size of the ionization chamber 24 and the voltage supplied by the power module 48 could be varied to meet the demands of any particular water system.

Figure 4:
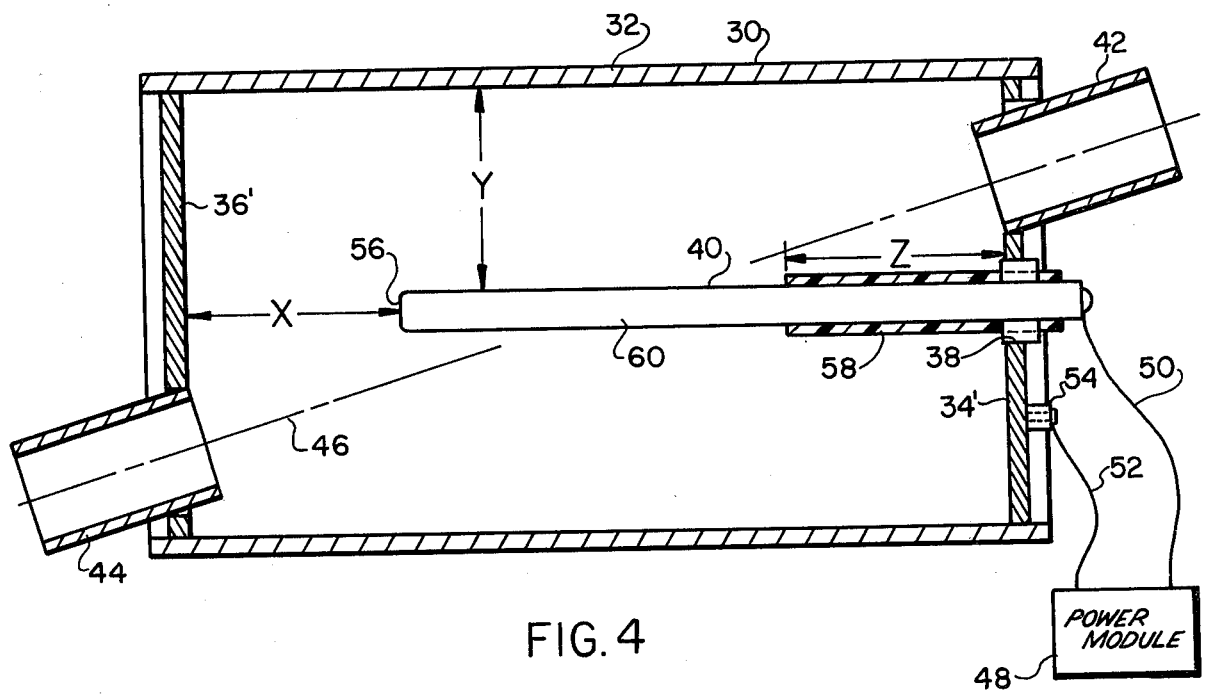
FIG. 4 is a sectional view of an ionization chamber according to an alternate embodiment of the present invention, taken through the longitudinal center line thereof.

In FIG. 4, an alternate embodiment of the ionization chamber of the present invention is illustrated, and because this alternate embodiment is substantially identical to the embodiments shown in FIGS. 2 and 3 described above, the same reference numerals have been used to identify corresponding parts, and to the extent that such parts are identical, the description of such parts above is equally applicable to the embodiment shown in FIG. 4. The only significant difference in the FIG. 4 embodiment is that the end walls 34', 36' of the housing 30 are formed as flat circular end plates rather than with a concave semi-spherical configuration as shown in FIG. 2. These flat end walls 34' and 36' have the advantage of facilitating construction of the housing 30 since the walls themselves are more easily formed and they may be more easily joined to the side wall 32. It will be noted in this alternate embodiment that the spacing between the electrode 40, and the end walls 34', 36' and side wall 32 is substantially equal, but the radially outward portions of the end walls 34', 36' having a somewhat greater spacing from the electrode 40 than from the central portion of the end walls 34', 36' and the side wall 32. However, this difference has no significant effect on the otherwise even distribution of electrical potential throughout the ionization chamber because a very large percentage of the housing 30 is evenly spaced from the electrode 40 so that there is no significant concentration of electrical energy at any particular points therebetween, it being particularly noted that the relatively small surface area at the radially outer portions of the end walls 34' and 36' have a greater spacing from the electrode 40 than the minimum spacing between the electrode 40 and the relatively large remaining area of the housing 30 so that there is no likelihood that there would be any concentration of electrical energy at the end walls 34' and 36'. Accordingly, the interior surface of the housing 30 in the FIG. 4 embodiment is substantially equally spaced from the electrode 30, and the aforesaid advantages attributed to the embodiment illustrated in FIGS. 2 and 3 would also be obtained in the FIG. 4 embodiment.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. An ionization chamber for use in a water system to control the formation of scale, said ionization chamber comprising:
   (a) a generally tubular housing formed of electrically conductive material, and having a longitudinally extending side wall and opposite end walls forming an enclosed chamber surrounded by said electrically conductive material, said enclosed chamber having an inlet conduit and an outlet conduit provided therein to permit liquid to flow through said enclosed chamber;
   (b) an electrode mounted in said housing to extend therewithin, the electrically conductive portion of said electrode being substantially equally spaced from said side wall and said end walls of said housing at all points along said electrically conductive portion of said electrode; and
   (c) an electrical source having one pole thereof electrically connected to said housing and having the opposite pole thereof connected to said electrode.

2. An ionization chamber as defined in claim 1, and further characterized in that said electrode extends into said tubular housing through one said end wall thereof and along the longitudinal extent of said housing, in that the spacing between the extending end of said electrode and the opposite end wall of said housing is substantially equal to the spacing between said electrode and said side wall of said housing, and in that said electrode has an electrically insulating member disposed thereabout, said insulating member extending from said one end wall of said housing for a length corresponding substantially to said spacing between said end of said electrode and said opposite end wall of said housing.

3. An ionization chamber as defined in claim 2 and further characterized in that said side wall of said housing is a cylinder, and in that the end walls of said housing have facing semi-spherical shapes, the radius of said cylindrical side walls being substantially equal to the radius of said semi-spherical end walls.

4. An ionization chamber as defined in claim 3 and further characterized in that said inlet conduit and said outlet conduit are located in said end walls of said housing and in that the flow axes of said inlet and outlet conduit lie at a small acute angle with respect to the longitudinal axis of said housing whereby fluid flow through said housing will be generally parallel to the longitudinal extent of said electrode.

5. An ionization chamber as defined in claim 2, and further characterized in that said side wall of said housing is a cylinder, and in that said end walls of said housing are flat walls extending perpendicular to the axis of said cylindrical side wall.

6. An ionization chamber for use in a water system to control the formation of scale, said ionization chamber comprising:
   (a) a generally tubular housing formed of electrically conductive material, and having a longitudinally extending side wall and opposite end walls forming an enclosed chamber surrounded by said electrically conductive material, said enclosed chamber having an inlet conduit and an outlet conduit provided therein to permit liquid to flow through said enclosed chamber;
   (b) an electrode mounted in said housing to extend therewithin, the electrically conductive portion of said electrode having a spacing from said housing side wall which is substantially equal to the minimum spacing between the ends of said electrically conductive electrode portion and said housing end walls; and
   (c) an electrical source having one pole thereof electrically connected to said housing and having the opposite pole thereof connected to said electrode.

7. An ionization chamber as defined in claim 6, and further characterized in that said housing side wall is cylindrical, in that said housing end walls are flat circular walls, and in that said electrically conductive portion of said electrode extends along the longitudinal axis of said housing.

8. An ionization chamber as defined in claim 6, and further characterized in that said housing side wall is cylindrical, in that said housing end walls are semispherical and have radii substantially equal to the radius of said cylindrical housing side wall, and in that said electrically conductive portion of said electrode extends along the longitudinal axis of said housing.

* * * * *